United States Patent
Shao et al.

(10) Patent No.: US 11,943,423 B2
(45) Date of Patent: Mar. 26, 2024

(54) STEREOSCOPIC DISPLAY DEVICE AND METHOD OF CALIBRATING SAME, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Jiyang Shao, Beijing (CN); Yuxin Bi, Beijing (CN); Feng Zi, Beijing (CN); Bingxin Liu, Beijing (CN); Binhua Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/130,722

(22) Filed: Apr. 4, 2023

(65) Prior Publication Data

US 2023/0239454 A1    Jul. 27, 2023

Related U.S. Application Data

(63) Continuation of application No. 17/464,506, filed on Sep. 1, 2021, now Pat. No. 11,652,977.

(30) Foreign Application Priority Data

Sep. 4, 2020    (CN) .......................... 202010923876.9

(51) Int. Cl.
*H04N 13/246*    (2018.01)
*G09G 5/00*    (2006.01)
*H04N 13/296*    (2018.01)

(52) U.S. Cl.
CPC .......... *H04N 13/246* (2018.05); *G09G 5/003* (2013.01); *H04N 13/296* (2018.05)

(58) Field of Classification Search
CPC .. H04N 13/246; H04N 13/296; H04N 13/327; G09G 5/003; G09G 3/003; G02B 30/54
(Continued)

(56) References Cited

U.S. PATENT DOCUMENTS 6,247,650 B1    6/2001    Vachette et al.
6,721,023 B1    4/2004    Weiss et al.
(Continued)

FOREIGN PATENT DOCUMENTS

CN    105684439 A    6/2016
CN    107065210 A    8/2017
(Continued)

OTHER PUBLICATIONS

Xinxin Zhou. "Research on the Characteristics for Horizontal-Parallax-Only Light Field 3D Display." A dissertation for master's degree. Zhejiang University. Jul. 9, 2017.
(Continued)

*Primary Examiner* — Susan E. Torgerson
(74) *Attorney, Agent, or Firm* — IPro, PLLC

(57) ABSTRACT

Provided is a method of calibrating a stereoscopic display device. The device includes a motor and a display panel, and the display panel is driven by the motor to rotate to realize a stereoscopic display. The method includes acquiring a control strategy of the motor and display parameters of the display panel matching the control strategy, wherein the control strategy indicates that each time the motor runs for a preset period of time, the motor is restarted; controlling the motor to run according to the control strategy, to calibrate
(Continued)

the motor by restarting; and driving the display panel to display according to the display parameters in the rotation process of the motor.

20 Claims, 4 Drawing Sheets

(58) Field of Classification Search
USPC .......................................................... 348/47
See application file for complete search history.

(56) References Cited

U.S. PATENT DOCUMENTS

| | | |
|---|---|---|
| 2002/0172510 A1 | 11/2002 | Kobayashi et al. |
| 2011/0304614 A1 | 12/2011 | Yasunaga |
| 2015/0245014 A1 | 8/2015 | Guo et al. |
| 2018/0085088 A1 | 3/2018 | Du et al. |
| 2020/0169755 A1 | 5/2020 | Moosburger et al. |
| 2020/0195911 A1 | 6/2020 | Haseltine et al. |
| 2021/0400253 A1 | 12/2021 | Sun et al. |

FOREIGN PATENT DOCUMENTS

| | | |
|---|---|---|
| CN | 110515213 A | 11/2019 |
| CN | 111312127 A | 6/2020 |

OTHER PUBLICATIONS

CN202010923876.9 OA1.
CN202010923876.9 Notification to grant patent right for invention.
U.S. Appl. No. 17/464,506 Non final Action, dated Sep. 15, 2022.
U.S. Appl. No. 17/464,506 Notice of Allowance, dated Jan. 11, 2023.

STEREOSCOPIC DISPLAY DEVICE AND METHOD OF CALIBRATING SAME, AND STORAGE MEDIUM

CROSS-REFERENCE TO RELATED APPLICATION

This application is a continuation of U.S. application Ser. No. 17/464,506, filed on Sep. 1, 2021, which is based on and claims priority to the Chinese Patent Application No. 202010923876.9, filed on Sep. 4, 2020 and entitled "STEREOSCOPIC DISPLAY DEVICE AND METHOD OF CALIBRATING SAME", the disclosure of which is herein incorporated by reference in its entirety.

TECHNICAL FIELD

The present disclosure relates to the field of stereoscopic display technologies, and more particularly, to a stereoscopic display device and a method of calibrating the same.

BACKGROUND

Stereoscopic display technologies make use of human visual retention effect, i.e., the effect that human eyes' sensing of the luminance changes is delayed due to brain processing, and the response may lag 50 milliseconds (ms) to 100 ms. When the actual flicker exceeds this range, the human eyes cannot detect it. The processing unit of the stereoscopic display device decomposes the three-dimensional image to a plurality of two-dimensional image slices, and projects them on a display device with a flicker frequency of at least 10 Hz, thereby generating a stereoscopic vision by superimposing the residual images.

The moving display device is usually driven to rotate by a servo motor, and the rotation angle of the device is controlled by the servo motor through controlling the length of the pulse time. The stereoscopic vision generated based on the superposition of residual images is not a real three-dimensional image in the physical sense, but only taking the advantage of the "deceiving" human vision by using the effect of the superposition of images. Therefore, it is necessary to control the synchronization of the two-dimensional image slices with the motor to avoid the misalignment and blur or scatter, so as to ensure a good perception of the users.

SUMMARY

The embodiments of the present disclosure provide a stereoscopic display device, a method of calibrating the stereoscopic display device and a storage medium, and the technical solutions thereof are as follows.

In a first aspect of the embodiments of the present disclosure, a method of calibrating a stereoscopic display device is provided. The device includes a motor and a display panel, the display panel being driven by the motor to rotate to realize a stereoscopic display, and the method includes:

acquiring a control strategy of the motor and display parameters of the display panel matching the control strategy, wherein the control strategy indicates that each time the motor runs for a preset period of time, the motor is restarted;

controlling the motor to run according to the control strategy, to calibrate the motor by restarting; and driving the display panel to display according to the display parameters in the rotation process of the motor.

Optionally, the control strategy further indicates a change status of a rotational speed of the motor during the preset period of time.

Optionally, the change status is reflected by a rotational speed change curve showing a change of the rotational speed of the motor over time, and the rotational speed change curve includes a deceleration zone.

Optionally, the rotational speed change curve includes a plurality of deceleration zones; the motor runs at a uniform speed in each of the plurality of deceleration zones, and the motor decelerates between two adjacent deceleration zones among the plurality of deceleration zones.

Optionally, the display parameters include a display time of two-dimensional image slices in the display panel, and the two-dimensional image slices in a same deceleration zone have an equal display time, the two-dimensional image slices being obtained by a two-dimensional decomposition of a stereoscopic image to be displayed in the display panel.

Optionally, a two-dimensional image slice displayed between two adjacent deceleration zones has a display time longer than a display time of a two-dimensional image slice displayed in a preceding deceleration zone of the two adjacent deceleration zones, and shorter than a display time of a two-dimensional image slice displayed in a latter deceleration zone of the two adjacent deceleration zones.

Optionally, the rotational speed change curve further includes a transition zone post the deceleration zone, and the motor is restarted in the transition zone.

Optionally, the rotational speed change curve further includes an acceleration zone.

Optionally, the rotational speed change curve further includes a plurality of acceleration zones; the motor runs at a uniform speed in each of the plurality of acceleration zones, and the motor accelerates between two adjacent acceleration zones among the plurality of acceleration zones.

Optionally, the display parameters include a display time of the two-dimensional image slices in the display panel, and the two-dimensional image slices in a same acceleration zone have an equal display time; the two-dimensional image slices being obtained by a two-dimensional decomposition of a stereoscopic image to be displayed in the display panel.

Optionally, a two-dimensional image slice displayed between two adjacent acceleration zones has a display time shorter than a display time of a two-dimensional image slice displayed in a preceding acceleration zone of the two adjacent acceleration zones, and longer than a display time of a two-dimensional image slice displayed in a latter acceleration zone of the two adjacent acceleration zones.

Optionally, the display parameters include a display time and a display order of two-dimensional image slices in the display panel, the two-dimensional image slices being obtained by a two-dimensional decomposition of a stereoscopic image to be displayed in the display panel, and wherein driving the display panel to display according to the display parameters in the rotation process of the motor includes:

sequentially driving the display panel to display each of the two-dimensional image slices to be displayed in the rotation process, based on the display time and display order of each of the two-dimensional image slices.

Optionally, the rotational speed change curve further includes a uniform speed zone.

In a second aspect of the embodiments of the present disclosure, a stereoscopic display device is further provided. The device includes a motor and a display panel, the display panel is driven by the motor to run to realize a stereoscopic display, and the stereoscopic display device further includes: a memory and a processor, wherein the memory stores a computer program and when executed by the processor, the memory implements:

acquiring a control strategy of the motor and display parameters of the display panel matching the control strategy, wherein the control strategy indicates that each time the motor runs for a preset period of time, the motor is restarted;

controlling the motor to run according to the control strategy, to calibrate the motor by restarting; and driving the display panel to display according to the display parameters in the rotation process of the motor.

Optionally, the control strategy further indicates a change status of a rotational speed of the motor during the preset period of time.

Optionally, the change status is reflected by a rotational speed change curve showing a change of the rotational speed of the motor over time, and the rotational speed change curve includes a deceleration zone.

Optionally, the rotational speed change curve includes a plurality of deceleration zones; the motor runs at a uniform speed in each of the plurality of deceleration zones, and the motor decelerates between two adjacent deceleration zones among the plurality of deceleration zones.

Optionally, the display parameters include a display time of two-dimensional image slices in the display panel, and the two-dimensional image slices in a same deceleration zone have an equal display time, the two-dimensional image slices being obtained by a two-dimensional decomposition of a stereoscopic image to be displayed in the display panel.

Optionally, a two-dimensional image slice displayed between two adjacent deceleration zones has a display time longer than a display time of a two-dimensional image slice displayed in a preceding deceleration zone of the two adjacent deceleration zones, and shorter than a display time of a two-dimensional image slice displayed in a latter deceleration zone of the two adjacent deceleration zones.

In a third aspect of the embodiments of the present disclosure, a non-transitory computer-readable storage medium is further provided. One or more computer programs are stored on the storage medium, wherein when executed by a processor, the one or more computer programs perform a method of calibrating a stereoscopic display device including a motor and a display panel, the display panel being driven by the motor to run to realize a stereoscopic display; and the method includes:

acquiring a control strategy of the motor and display parameters of the display panel matching the control strategy, wherein the control strategy indicates that each time the motor runs for a preset period of time, the motor is restarted;

controlling the motor to run according to the control strategy, to calibrate the motor by restarting; and driving the display panel to display according to the display parameters in the rotation process of the motor.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and principles of the present disclosure, the present disclosure is described in detail hereinafter in combination with specific embodiments and with reference to the accompanying drawings.

It should be noted that unless otherwise defined, technical or scientific terms used in the embodiments of the present disclosure shall have ordinary meaning understood by persons of ordinary skill in the art to which the disclosure belongs. The terms "first", "second" and the like used in the embodiments of the present disclosure are not intended to indicate any order, quantity or importance, but are merely used to distinguish the different components. The terms "comprise, comprises and comprising" or "include, includes and including" and the like are used to indicate that the element or object preceding the terms covers the element or object following the terms and its equivalents, and shall not be understood as excluding other elements or objects. The terms "connect" or "contact" and the like are not intended to be limited to physical or mechanical connections, but may include electrical connections, either direct or indirect connection. The terms "on", "under", "left" and "right" are only used to indicate the relative positional relationship. When the absolute position of the described object changes, the relative positional relationship may change accordingly.

Figure 1:
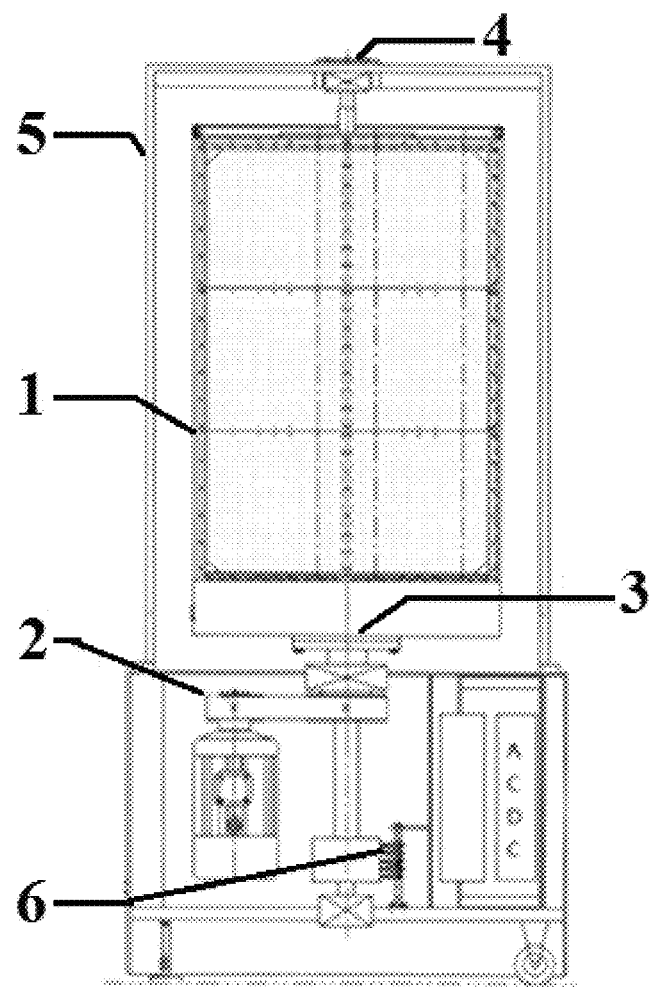
FIG. 1 is a schematic structural diagram of a stereoscopic display device according to an embodiment of the present disclosure.

FIG. 1 is a schematic structural diagram of a stereoscopic display device according to an embodiment of the present disclosure. Referring to FIG. 1, the stereoscopic display device includes a display panel 1 and a motor 2, wherein the motor 2 is configured to drive the display panel to run, and the display panel can display different two-dimensional images when rotating to different phases in the rotation process. Different two-dimensional images are displayed in different phases in the rotation process of the display panel. In this way, by using the visual retention effect of the human eyes, the human eyes can have a stereoscopic vision effect and the stereoscopic display can be realized.

Optionally, the motor 2 may be a servo motor. It should be noted that, according to the display requirements of the display device, persons skilled in the art can flexibly choose servo motors of appropriate rate, such as a servo motor with a rate of 15 round per second (rps) or 20 rps, which is not specifically defined here.

Optionally, as shown in FIG. 1, the display panel 1 is disposed between a rotating platform 3 and a top-supported structure 4, and a safety cover 5 is used to protect the display panel 1, the motor 2 and other components to avoid damage to these components.

Optionally, a power supply system including a slip-ring structure 6 is configured to provide power supply to the motor 2 and the display panel 1.

Figure 2:
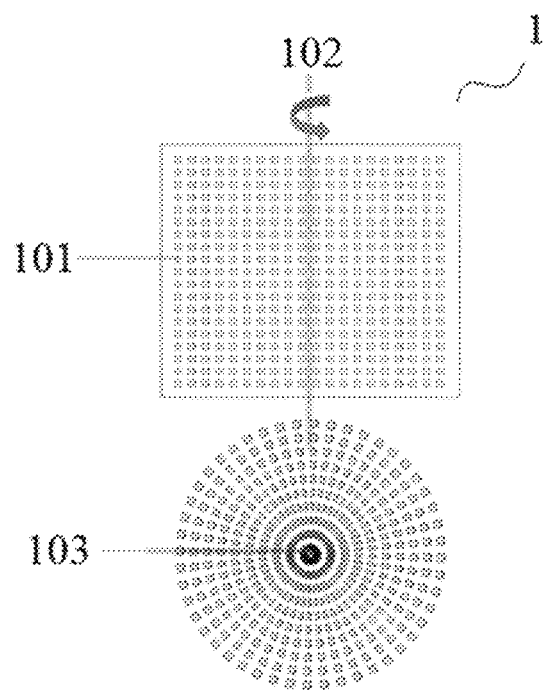
FIG. 2 is a schematic diagram of the rotation of a display panel according to an embodiment of the present disclosure.

Optionally, referring to FIG. 2, the display panel 1 includes a plurality of pixels 101 arranged in array. Driven by the motor 2, the display panel 1 can rotate at a preset angular velocity about an axis of the line 102 parallel to the columns of the pixels and passing through the display panel 1, and when the display panel 1 rotates by different angles, different phases 103 are obtained. At different phases 103, the display panel 1 displays different two-dimensional image slices which correspond to different images respectively. Utilizing the visual retention effect of human eyes, the superposition of the residual images of the different two-dimensional image slices can generate a stereoscopic vision, and the stereoscopic display can be realized.

It should be noted that the plurality of two-dimensional image slices are obtained by a two-dimensional decomposition of the stereoscopic images to be displayed, thus each two-dimensional image slice has a preset phase.

Further, when the motor 2 turns by a certain angle, it can also drive the display panel 1 to rotate. Meanwhile, the display picture information is sent to a driver Integrated Circuit (driver IC) by the processing unit at a fixed frequency. According to the display picture information, the driver IC can drive the display panel to display the image indicated by the display picture information. The rate at which the display panel displays images matches the rate at which the driver IC drives the display panel to display images, and the images displayed by the display panel can accumulate to synthesize stereoscopic images, such that 3D images can be obtained.

Figure 3:
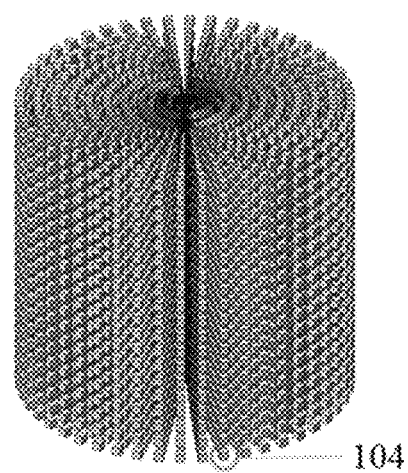
FIG. 3 is a schematic diagram showing the rotating stereoscopic image of a display panel in FIG. 2.

It should be understood that, as shown in FIG. 3, as the display panel 1 rotates at a certain angular velocity, each time the display panel display a two-dimensional image slice, it sweeps across a certain angle. In this process, the pixel 101 used for displaying the two-dimensional image slice forms a corresponding voxel 104. Here, the voxel 104 can be understood as a spatial element formed when the display panel displays the pixel and sweeps across a certain angle. Thus, the voxel may also be viewed as a stereoscopic pixel.

Optionally, the pitch $\Delta$ (the radian) of the outermost adjacent voxels 104 may be equal to the pitch of the pixels 101 of the display panel 1, which can enable the display panel to have a more ideal display effect. In this case, the minimum value of the number of the two-dimensional image slices in each rotation circumference may be equal to the number of the pitches included in the rotation circumference. Here, the pitch of the outermost adjacent voxels 104 refers to a distance between the two adjacent voxels 104 located at the outermost. The voxels 104 located at the outermost refer to the voxels formed by the pixels of the display panel which are furthest from the axis. The adjacent voxels 104 refer to two voxels 104 obtained in two sequential displays of the two-dimensional image slices by the display panel.

It should be noted that due to the existence of the turning error of the motor 2, the actual phase of a two-dimensional image slice displayed on the display panel 1 may be not aligned with the preset phase of the two-dimensional image slice, and the misalignment of any two-dimensional image slice will affect the phase of a two-dimensional image slice displayed after the two-dimensional image slice. As a result, the stereoscopic image generated by superposing the residual images would be blurry and scattered, and even fail in combination, which will affect the perception of users.

Figure 4:
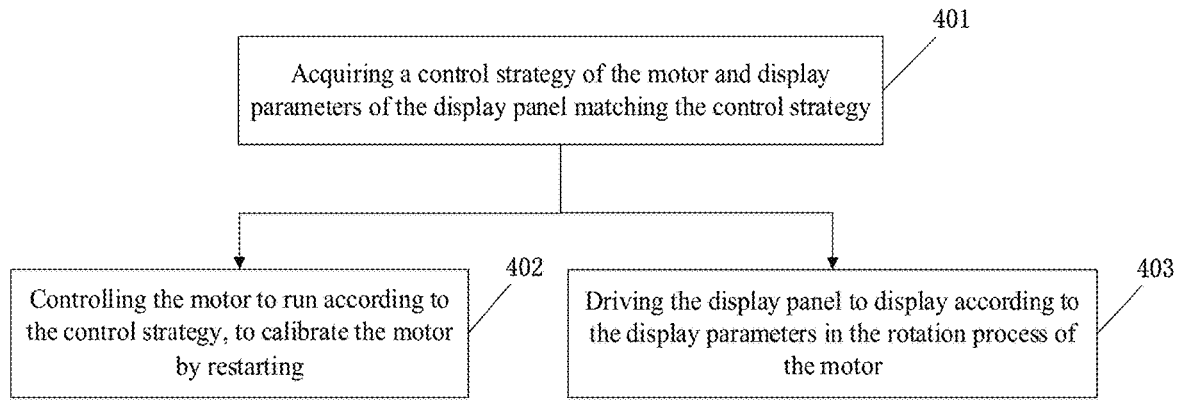
FIG. 4 is a flowchart showing a method of calibrating a stereoscopic display device according to an embodiment of the present disclosure.

The embodiments of the present disclosure provide a method of calibrating a stereoscopic display device. As shown in FIG. 4, the method includes the following steps.

Step 401 includes acquiring a control strategy of the motor and display parameters of the display panel matching the control strategy, wherein the control strategy indicates that each time the motor runs for a preset period of time, the motor is restarted.

Here, by restarting the motor, the turning error of the motor can be calibrated. The turning error of the motor may include a no-load error and a rotation error of the motor, for example, the total error is equal to the sum of the no-load error plus the rotation error. The no-load error is determined by the inherent property of the motor and can be obtained by testing the motor at a specified rotational speed, and generally cannot be eliminated. The rotation error is the cumulative error in the rotation process of the motor and will change over the rotation time, and can be eliminated by some measures. Therefore, periodical calibration can be made to reduce or eliminate the rotation error, so as to make the rotation error become zero or approximate a certain value after the calibration. For example, the rotation error can be controlled to vary within a small range acceptable for the stereoscopic display. In one case, when the motor runs, if the rotational speed of the motor is higher relative to the set speed, the rotation error will generate. In the other case, when the motor rotates, if the rotational speed of motor is lower relative to the set speed, the rotation error will generate.

Optionally, the control strategy of the motor may include a strategy for controlling the rotational speed of the motor. For example, in addition to indicating the restart of the motor after each preset period of time, the control strategy may also indicate change status of the rotational speed of the motor during the preset period of time.

In a possible implementation, the change status may be reflected by a rotational speed change curve showing the change of the rotational speed of the motor over time. The rotational speed change curve may be determined according to a motor characteristic curve. The rotational speed change curve sets the changing trend of the rotational speed of motor during the preset period of time. By controlling the rotational speed of the motor according to the rotational speed change curve, the rotation error of the motor in the rotation process can be reduced, and the rotational speed of the motor can be adjusted to meet the needs of stereoscopic display. It should be understood that commercial motors usually come with the motor characteristic curves corresponding to the motors.

In the rotation process of the motor, the speed of the motor should not be suddenly changed to the set speed and a certain buffer time is needed to gradually change the speed of the motor. In an embodiment, the rotational speed change curve may include a deceleration zone. By controlling the motor to run according to the deceleration zone in the rotational speed change curve, the rotational speed of the motor can be decelerated to the set speed. For example, the rotational speed change curve may include a uniform speed zone, and the rotational speed of the uniform speed zone is greater than or equal to the maximum speed of the deceleration zone. As such, by controlling the motor to run according to the deceleration zone, the speed of the motor can be decelerated from the speed of the uniform speed zone to the speed of the deceleration zone. In another example, when the rotational speed of the motor is higher relative to the set speed, the deceleration zone can help to reduce the speed of the motor to a value approximating the set speed.

Optionally, the rotational speed change curve may include a plurality of deceleration zones. In an embodiment, the motor runs at a uniform speed in each of the plurality of deceleration zones, and the motor decelerates between two adjacent deceleration zones among the plurality of deceleration zones. That is, each of the plurality of deceleration zones is essentially a uniform speed zone, and the speeds of any two deceleration zones are different. For two deceleration zones having adjacent sequential positions, a speed of the preceding deceleration zone is greater than a speed of the latter deceleration zone. Thus, it can be determined that when the motors are controlled to run in accordance with the two deceleration zones of adjacent sequential positions, the motor runs at the corresponding uniform rotational speed within each deceleration zone, and the speed of the motor will decrease from the speed of the preceding deceleration zone to the speed of the latter deceleration zone. The plurality of deceleration zones may be divided according to the application requirements, such as the duration of the respective zones or rotation angle of the motor. In an embodiment, the durations of the plurality of deceleration zones may be equal or unequal, or, the plurality of deceleration zones may be divided by making the motor run by equal angle in the plurality of deceleration zones, which is not specified in the embodiments of the present disclosure.

Accordingly, in the case that the motor runs at a uniform speed in each of the plurality of deceleration zones, the display parameters matching this case include the display time of the two-dimensional image slices in the display panel, and the display time of the two-dimensional image slices in a same deceleration zone may be equal. Here, the two-dimensional image slices are obtained by two-dimensional decomposition of stereoscopic image to be displayed in the display panel. When the motor runs at a uniform speed within each deceleration zone, if the display time of the two-dimensional image slices in the same deceleration zone are equal, the rotation angles by which each of the displayed two-dimensional image slices rotates are the same during the corresponding time of the deceleration zone of the display panel. As such, the process that the display panel displays pictures can match the rotation process of the motor, which can ensure the display effect of the pictures.

Further, the two-dimensional image slice between two adjacent deceleration zones may have a display time longer than a display time of the two-dimensional image slices in the preceding deceleration zone of the two adjacent deceleration zones, and may be shorter than a display time of the two-dimensional image slices in the latter deceleration zone of the two adjacent deceleration zones. In this case, the process of displaying the two-dimensional image slice between the two adjacent deceleration zones may be regarded as a transitional display process between two deceleration zones. Because the motor decelerates between the two adjacent deceleration zones of the plurality of deceleration zones, and the display time of the two-dimensional image slices in the same deceleration area are equal, by controlling the display time of the two-dimensional image slice in the transition process to be longer than the corresponding display time in the preceding deceleration zone and shorter than the corresponding display time in the latter deceleration zone, the display time of the two-dimensional image slice in the transitional process can be slowly changed from the display time of the preceding deceleration zone to the display time of the latter deceleration zone, thereby alleviating the change in display effect of the images caused by the sudden change of the display time of two-dimensional image slices, which ensures the perception of users.

It should be noted that, the refresh rate of the stereoscopic display device is very high. For example, the refresh rate is usually equal to the number of voxels multiplied by the number of slices multiplied by the number of rotation rounds per second. For a monochrome LED screen, assuming that the number of voxels involved in the rotation imaging is 45×96, the number of slices is 270, and the rotation is 20 rounds per second, then the corresponding refresh rate is about 24 megabytes (M). In the case of such high refresh rate, if each two-dimensional image slice uses a different display time, the time sequence will be too complicated and the control difficulty will be increased. Therefore, in the embodiments of the present disclosure, by setting the motor to run at a uniform speed in each of the plurality of deceleration zones, and setting the display time of the two-dimensional image slices in the same deceleration zone to be equal, the control difficulty of the stereoscopic display device can be simplified while still performing the calibration for the motor.

After passing through the deceleration zone, the speed of the motor may be reduced to 0 to realize the shutdown of the motor. If the motor need to be restarted, it is necessary to accelerate the motor to increase the rotational speed of the motor to the speed of the uniform speed zone so as to display the images normally. Or, when the rotational speed of the motor is slower relative to the set speed, the rotational speed of the motor may reach the set speed through an acceleration process. As a feasible implementation manner, the rotational speed change curve may also include an acceleration zone.

Optionally, the rotational speed change curve may include a plurality of acceleration zones. In an embodiment, the motor runs at a uniform speed in each of the plurality of acceleration zones, and the motor accelerates between two adjacent acceleration zones among the plurality of acceleration zones. That is, each of the plurality of acceleration zones is essentially a uniform speed zone, and the speeds of any two acceleration zones are different. For two acceleration zones of having adjacent sequential positions, a speed of the preceding acceleration zone is less than a speed of the latter acceleration zone. Thus, it can be determined that when the motors are controlled to run in accordance with the two acceleration zones of adjacent sequential positions, the motor runs at the corresponding uniform rotational speed within each acceleration zone, and the speed of the motor will increase from the speed of the preceding acceleration zone to the speed of the latter acceleration zone. The plurality of acceleration zones may be divided according to the application requirements, such as the duration of the respective zones or rotation angle of the motor. In an embodiment, the durations of the plurality of acceleration zones may be equal or unequal, or, the plurality of acceleration zones may be divided by making the motor run by equal angle in the plurality of acceleration zones, which is not specified in the embodiments of the present disclosure.

Accordingly, in the case that the motor runs at a uniform speed n each of the plurality of acceleration zones, the display time of the two-dimensional image slices in a same acceleration zone may be equal. When the motor runs at a uniform speed within each acceleration zone, if the display time of the two-dimensional image slices in the same acceleration zone are equal, the rotation angles by which each of the displayed two-dimensional image slices rotates are the same during the corresponding time period of the acceleration zone of the display panel. As such, the process that the display panel displays pictures can match the rotation process of the motor, which can ensure the display effect of the pictures.

Further, the two-dimensional image slice between two adjacent acceleration zones may have a display time shorter than a display time of the two-dimensional image slices in the preceding acceleration zone of the two adjacent acceleration zones, and may be longer than a display time of the two-dimensional image slices in the latter acceleration zone of the two adjacent acceleration zones. In this way, the display time of the two-dimensional image slice can be slowly changed from the display time of the preceding acceleration zone to the display time of the latter acceleration zone, thereby alleviating the change in display effect of the images caused by the sudden change of the display time of two-dimensional image slices, which effectively avoids stalling of the pictures and ensures the perception of users.

In addition, because the display panel needs to display two-dimensional image slices in both the deceleration zone and the acceleration zone, and there may exist control errors in the control process of the motor and the process of driving the display panel to display images, it may be of great difficulty to only use the deceleration zone and acceleration zone to control the motor to restart. In an embodiment, the rotational speed change curve may further include transition zones subsequent to the deceleration zones (such as the transition zone with a duration of t in FIG. 5), and the motor is restarted in the transition zone. For example, the operation status of the motor may change from the speed of the deceleration zone to the speed of zero, and then change from the speed of zero to a certain starting speed. By setting the transition zone, the motor can be restarted in the transition zone, and the control difficulty caused by the control errors in the control process of the motor and the driving process of the display panel can be avoided. Moreover, when the motor runs within the transition zone, the display panel may also be controlled to display, which may also ensure the perception of users.

It should be understood that the display parameters may also include the display order of the two-dimensional image slices and image information, etc., which are not specifically defined here. Display parameters may be obtained by external test. Alternatively, the display parameters may be obtained by simulating the stereoscopic display device with a simulation software. For example, the rotation process of the motor may be simulated by the simulation software, and then an actual rotation position of the motor in the running process can be determined. Based on the actual rotation position, the display parameters such as the display time of the two-dimensional image slices can be determined. Alternatively, the display parameters may also be tested on a real system. For example, the display parameters may be preset according to a rotational speed change curve, and then the stereoscopic display device is controlled to run in accordance with the rotational speed change curve and the preset display parameters. And in the running process of the stereoscopic display device, light observation and test can be performed to determining whether the display parameters are suitable based on the results of the observation and test.

If the stereoscopic imaging effect is determined to be not ideal based on the observation and test results, it is determined that the preset display parameters do not match the rotational speed change curve, and adjustments need to be made to the preset display parameters until the obtained stereoscopic imaging effect meets the design requirements.

It should be noted that in the rotational speed change curve, the deceleration zone, the uniform speed zone, the acceleration zone and the transition zone may all be set according to the application requirements. For example, the foregoing zones may be determined according to the display requirements of the display panel and characteristic curve of the motor. When the requirements on display device is high and the motor needs a higher calibration frequency, the duration of the uniform speed zone may be appropriately shortened. In addition, the distribution of deceleration zone, uniform speed zone, acceleration zone and transition zone in the rotational speed change curve may be expressed either in terms of time duration or in terms of the number of rotation rounds. For example, a duration of the uniform speed zone may be 3 minutes, and a duration of the deceleration zone may be 0.5 minutes. In another example, a duration of the uniform speed zone may be 2 rounds, and a duration of the deceleration zone may be 0.5 rounds. In addition, the calibration cycle of the motor may also be set according to the application requirements, for example, the motor may be set as being restarted once each time the display panel rotates by one round. In addition, although the above description illustrates the rotational speed change curve with the example of uniform rotation of the motor in a same deceleration zone and uniform rotation of the motor in a same acceleration zone, it does not exclude the implementation manners in which uniformly varied speed, non-uniform deceleration or other deceleration manners are applied in the deceleration zone to realize deceleration, and uniformly varied speed, non-uniform acceleration or other acceleration manners are applied in the acceleration zone to realize acceleration.

Step 402 includes controlling the motor to run according to the control strategy, to calibrate the motor by restarting.

In an implementation, for a servo motor, the speed of the servo motor can be controlled by controlling the length of the pulse time. By controlling the motor to run according to the control strategy, the restart of the motor can be conducted, and then the turning error of the motor can be calibrated via the restart.

Step 403 includes driving the display panel to display according to display parameters in the rotation process of the motor.

Optionally, the display parameters include a display time and a display order of the two-dimensional image slices in the display panel. In this case, step 403 may be implemented as: driving, based on the display time and display order of the respective two-dimensional image slices to be displayed in the rotation process, the display panel to display the two-dimensional image slices sequentially. As such, according to the display time and display order of the respective two-dimensional image slices, the display picture information of the corresponding two-dimensional image slice may be sent to the driver IC, and the driver IC then drives the display panel to display according to the display picture information.

In view that the display parameters matching the control strategy of the motor, in the process of controlling the motor to run according to the control strategy, by driving the display panel to display according to display parameters matching the control strategy, the actual phase of the respective two-dimensional image slices determined by the rotation position of the motor matches the default phase of the respective two-dimensional image slices, thereby avoiding the problems such as the misalignment of the display pictures and the blurry stereoscopic display images caused by the speed change in the calibration process, which can effectively ensure the quality of stereoscopic display images and improve the perception of users.

In combination with FIGS. 5 to 7, the rotational speed change curve of the embodiments of the present disclosure is illustrated in the following.

Figure 5:
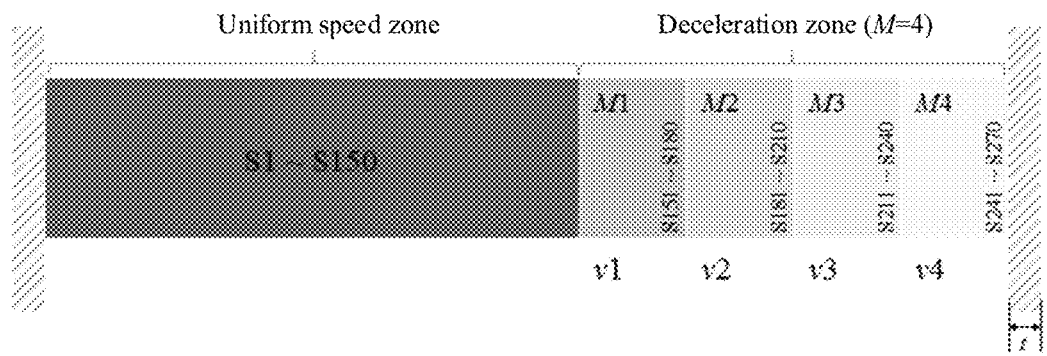
FIG. 5 is a schematic diagram of a corresponding relationship between two-dimensional image slices with the uniform speed zones and the deceleration zones.

Referring to FIG. 5, it is assumed that the number of two-dimensional image slices to be displayed by the display panel in one round is 270, and the motor is calibrated each time the display panel rotates by one round. During the round of the display panel, the motor is first controlled to run in accordance with the speed in the uniform speed zone. In this process, the display panel is driven to display the first 150 two-dimensional image slices at a regular and fixed frequency. After that, the motor runs in accordance with the curve of the deceleration zones. The rotational speed change curve includes four deceleration zones, M1 to M4, and the average speeds of M1 to M4 are v1, v2, v3, v4 (v1>v2>v3>v4), respectively. Because the four deceleration zones are divided by making the motor run by equal rotation angle, the corresponding numbers of the two-dimensional image slices in the four deceleration zones are equal, which are 30 pieces.

Figure 6:
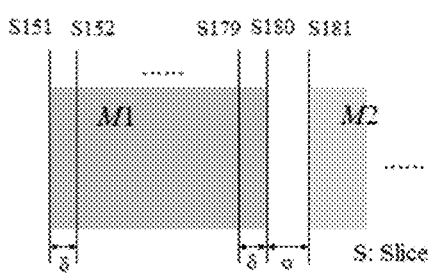
FIG. 6 is a schematic diagram showing the display time of two-dimensional image slices corresponding to the variable speed zones.
Figure 7:
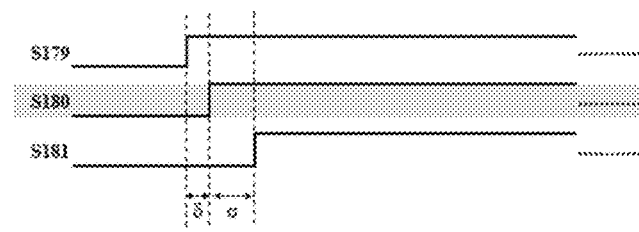
FIG. 7 is a schematic sequential diagram of two-dimensional image slices corresponding to the variable speed zones according to an embodiment of the present disclosure.

Referring to FIG. 6 and FIG. 7, the two-dimensional image slices to be displayed by the display panel in M1 zone are two-dimensional image slices 151 to 180. The two-dimensional image slices 151 to 180 have the same display time, and the display time of each two-dimensional image slice is denoted by δ. The two-dimensional image slices to be displayed by the display panel in M2 zone are two-dimensional image slices 181 to 210, and the two-dimensional image slices 181 to 210 have the same display time. The two-dimensional image slices to be displayed by the display panel in M3 zone are two-dimensional image slices 211 to 240, and the two-dimensional image slices 211 to 240 have the same display time. The two-dimensional image slices to be displayed by the display panel in M4 zone are two-dimensional image slices 241 to 270, and the two-dimensional image slices 241 to 270 have the same display time.

Persons skilled in the art may understand that, for the deceleration zones, the speed is getting slower and slower. Therefore, the display time of each of the two-dimensional image slices 181 to 219 corresponding to the M2 zone should be longer than the display time of each of the two-dimensional image slices corresponding to the M1 zone. The display time of each of the two-dimensional image slices corresponding to the M3 zone should be longer than the display time of each of the two-dimensional image slices corresponding to the M2 zone, and the display time of each of the two-dimensional image slices corresponding to the M4 zone should be longer than the display time of each of the two-dimensional image slices corresponding to the M3 zone.

Furthermore, the display parameters also include the buffer time (see σ in FIG. 6 and FIG. 7), which is the display time of the two-dimensional image slice between two adjacent deceleration zones. Optionally, the buffer time is between the display time of each two-dimensional image slice in the preceding deceleration zone and the display time of each two-dimensional image slice in the latter deceleration zone. For example, for the deceleration zones, the buffer time is longer than the display time of the preceding deceleration zone and shorter than the display time of the latter deceleration zone. FIG. 6 and FIG. 7 show the display time and sequence of the two-dimensional image slice 180 between the deceleration zones M1 and M2. The display time of the two-dimensional image slice 180 is the buffer time. It can be seen that the display time of the two-dimensional image slice 180 is longer than the display time of the two-dimensional image slice in the deceleration zone M1, and is shorter than the display time of two-dimensional image slice in the deceleration zone M2.

Some implementations of the embodiments of the present disclosure are described above and others are within the scope of the claims. In some cases, the actions or steps recorded in the claims may be performed in a different order from the embodiments and can still achieve the desired results. In addition, the processes described in the accompanying drawings may be performed in orders other than the particular order or sequential order and the desired results can still be achieved. In some embodiments, multitasking and parallel processing are also possible or may be advantageous.

In the method of calibrating the stereoscopic display device provided in the embodiments of the present disclosure, by acquiring a control strategy of the motor and display parameters of the display panel matching the control strategy, and controlling the motor to run according to the control strategy to calibrate the motor by restarting, the stereoscopic display of the display panel can be prevented from generating blurry and scattered images caused by the motor. Meanwhile, by driving the display panel to display according to the display parameters matching the control strategy, it can be ensured that the display pictures of the display panel match the rotation process of the motor, thereby avoiding the problems such as the misalignment of the display pictures and the blurry stereoscopic display images caused by the speed change in the calibration process. Therefore, the stereoscopic display device can effectively ensure the quality of stereoscopic display images and improve the perception of users through the calibration of the motor.

Figure 8:
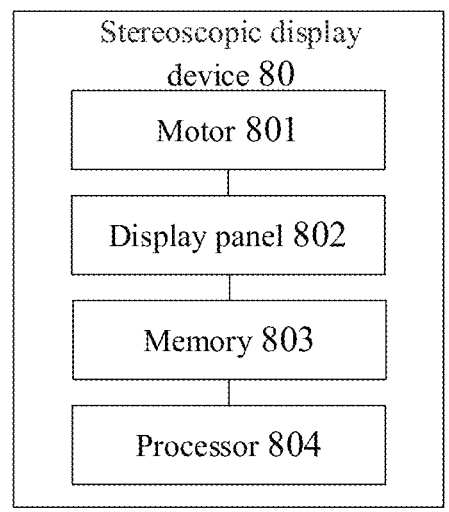
FIG. 8 is a schematic structural diagram of another stereoscopic display device according to an embodiment of the present disclosure.

The embodiments of the present disclosure further provide a stereoscopic display device. As shown in FIG. 8, the stereoscopic display device 80 includes a motor 801 and a display panel 802, the display panel being driven by the motor to rotate to realize a stereoscopic display; the stereoscopic display device further includes a memory and a processor, wherein the memory stores a computer program, and when executed by the processor, the memory implements:

acquiring a control strategy of the motor and display parameters of the display panel matching the control strategy, wherein the control strategy indicates that each time the motor runs for a preset period of time, the motor is restarted.

controlling the motor to run according to the control strategy, to calibrate the motor by restarting.

driving the display panel to display according to the display parameters in the rotation process of the motor.

Optionally, the control strategy further indicates a change status of a rotational speed of the motor during the preset period of time.

Optionally, the change status is reflected by a rotational speed change curve showing a change of the rotational speed of the motor over time, and the rotational speed change curve includes a deceleration zone.

Optionally, the rotational speed change curve includes a plurality of deceleration zones; the motor runs at a uniform speed in each of the plurality of deceleration zones, and the motor decelerates between two adjacent deceleration zones among the plurality of deceleration zones.

Optionally, the display parameters include a display time of two-dimensional image slices in the display panel, the two-dimensional image slices in a same deceleration zone have an equal display time, and the two-dimensional image slices are obtained by a two-dimensional decomposition of a stereoscopic image to be displayed in the display panel.

Optionally, the two-dimensional image slice displayed between two adjacent deceleration zones has the display time longer than a display time of a two-dimensional image slice displayed in a preceding deceleration zone of the two adjacent deceleration zones, and shorter than a display time of a two-dimensional image slice displayed in a latter deceleration zone of the two adjacent deceleration zones.

Optionally, the rotational speed change curve further includes a transition zone located post the deceleration zone, and the motor is restarted in the transition zone.

Optionally, the rotational speed change curve further includes an acceleration zone.

Optionally, the rotational speed change curve further includes a plurality of acceleration zones; the motor runs at a uniform speed in each of the plurality of acceleration zones, and the motor accelerates between two adjacent acceleration zones among the plurality of acceleration zones.

Optionally, the display parameters include a display time of two-dimensional image slices in the display panel, the two-dimensional image slices in a same acceleration zone have an equal display time, and the two-dimensional image slices are obtained by a two-dimensional decomposition of a stereoscopic image to be displayed in the display panel.

Optionally, a two-dimensional image slice between two adjacent acceleration zones has a display time shorter than a display time of a two-dimensional image slice in a preceding acceleration zone of the two adjacent acceleration zones, and longer than a display time of a two-dimensional image slice in a latter acceleration zone of the two adjacent acceleration zones.

Optionally, the display parameters include a display time and a display order of the two-dimensional image slices in the display panel, and the two-dimensional image slices are obtained by the two-dimensional decomposition of the stereoscopic image to be displayed in the display panel. Correspondingly, driving the display panel to display according to the display parameters in the rotation process of the motor includes driving the display panel to sequentially display each of the two-dimensional image slices to be displayed in the rotation process, based on the display time and display order of each of the two-dimensional image slices.

Optionally, the rotational speed change curve further includes a uniform speed zone.

In the stereoscopic display device provided in the embodiments of the present disclosure, by acquiring a control strategy of the motor and display parameters of the display panel matching the control strategy, and controlling the motor to run according to the control strategy to calibrate the motor by restarting, the stereoscopic display of the display panel can be prevented from generating blurry and scattered images caused by the motor. Meanwhile, by driving the display panel to display according to the display parameters matching the control strategy, it can be ensured that the display pictures of the display panel match the rotation process of the motor, thereby avoiding the problems such as the misalignment of the display pictures and the blurry stereoscopic display images caused by the speed change in the calibration process. Therefore, the stereoscopic display device can effectively ensure the quality of stereoscopic display images and improve the perception of users through the calibration of the motor.

For the convenience of description, the above devices are described separately by functional modules. Of course, when implementing the embodiments, the present disclosure, the functions of the respective modules may be implemented in a same software and/or hardware or multiple software and/or hardware.

The device of the foregoing embodiments may be configured to realize the corresponding method in the foregoing embodiments and have the beneficial effect of the corresponding method embodiments, which is not repeated here.

Figure 9:
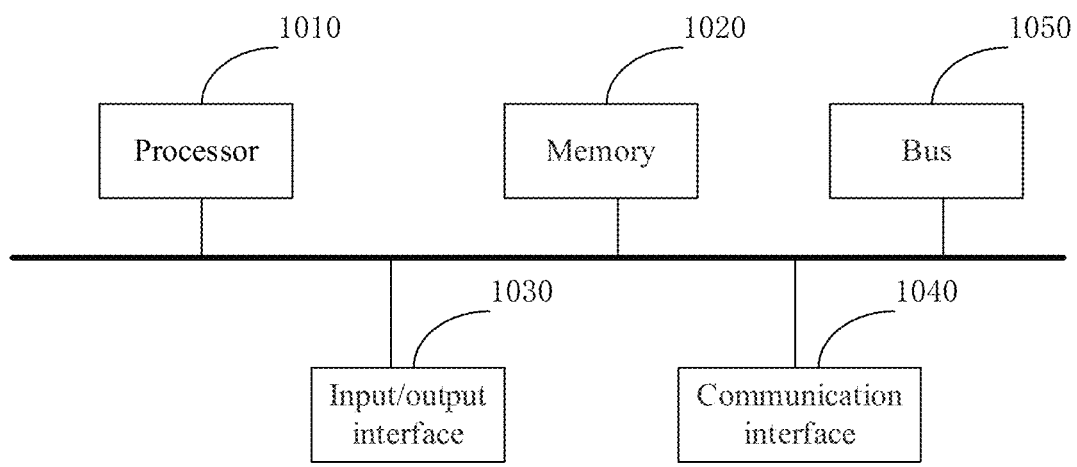
FIG. 9 is a schematic structural diagram of an electronic device according to an embodiment of the present disclosure.

FIG. 9 is a schematic diagram showing a more specific hardware structure of an electronic device provided by an embodiment of the present disclosure. The electronic device may include a processor 1010, a memory 1020, an input/output interface 1030, a communication interface 1040 and a bus 1050. The processor 1010, the memory 1020, the input/output interface 1030 and the communication interface 1040 realize an in-device communication connection among one other through the bus 1050.

The processor 1010 may be implemented by Central Processing Unit (CPU), microprocessor, Application Specific Integrated Circuit (ASIC), or one or more integrated circuits, so as to execute corresponding programs, thereby implementing the technical solutions provided by the embodiments of the present disclosure.

The memory 1020 may be implemented in the form of Read Only Memory (ROM), Random Access Memory (RAM), static storage device, dynamic storage device, etc. The memory 1020 may store the operating system and other applications, and when the technical solutions provided by the embodiments of the present disclosure are implemented by software or firmware, the related program code is stored in memory 1020 and invoked for being executed by the processor 1010.

The input/output interface 1030 is configured to connect with an input/output module for information input and output. The input/output module may be implemented as components in the device (not shown in the figures) or may be connected to the device to provide corresponding function. Such input device may include keyboard, mouse, touch screen, microphone, various sensors and the like, and such output device may include display, speaker, vibrator, indicator light and the like.

The communication interface 1040 is configured to connect with a communication module (not shown in the figures) to realize the communication between the device and other devices. The communication module may communicate through wired mode (such as USB, network cable, etc.) or wireless mode (such as mobile network, WIFI, Bluetooth, etc.).

The bus 1050 includes a channel for transmitting information among the various components of the device, such as the processor 1010, the memory 1020, the input/output interface 1030, and the communication interface 1040.

It should be noted that although only the processor 1010, the memory 1020, the input/output interface 1030, the communication interface 1040 and the bus 1050 are shown for the foregoing device, the device may also include other components necessary for normal operation while implementing the embodiments of the present disclosure. In addition, it should be understood by persons skilled in the art that the foregoing device may also only include components necessary for implementing the embodiments of the present disclosure but are not necessary to contain all the components shown in the figure.

The computer-readable storage medium of the embodiments of the present disclosure includes permanent and non-permanent, removable and non-removable medium so that any method or technology can be used to implement information storage. In some embodiments, the computer-readable medium of the embodiments of the present disclosure is non-transitory. The information may be computer-readable instructions, data structures, modules of programs, or other data. Examples of computer-readable storage medium include but are not limited to, phase change random access memory (PRAM), static random access memory (SRAM) and dynamic random access memory (DRAM), and other types of random access memory (RAM), read-only memory (ROM), electrically erasable programmable read-only memory (EEPROM), flash memory, or other memory technology, compact Disc-Read Only Memory (CD ROM), digital versatile disks or other optical storage, cassette tape, magnetic disk storage or other magnetic storage device or any other non-transmission medium, which may be used to store information that can be accessed by a computing device.

Persons of ordinary skill in the art should understand that the discussions on any of the foregoing embodiments are only exemplary and are not intended to imply that the scope of the present disclosure (including claims) is limited to such examples. The foregoing embodiments or the technical features in different embodiments may also be combined under the idea of the present disclosure. The steps may be implemented in any order, and there are many other variations on the different aspects of the embodiments of the present disclosure as described above, which are not provided in detail for simplicity.

In addition, to simplify the explanations and discussions, and so as not to make the embodiments of the present disclosure difficult to understand, known power/ground connections of the integrated circuit (IC) chips and other components may or may not be shown in the accompanying drawings. In addition, the devices may be shown in the form of block diagram, in order to avoid making the embodiments of the present disclosure difficult to understand. And it also considers the following facts that the details about the implementing method of the blocks of the device highly depend on the platform for implementing the embodiments of the present disclosure (that is, the details shall be entirely within the scope of capability of the persons skilled in the art). Where specific details (e.g., circuits) are provided to describe exemplary embodiments of the present disclosure, it is obvious to the persons skilled in the art that the present disclosure may be implemented without or with variations on these specific details. Therefore, the descriptions should be considered illustrative rather than restrictive.

Although the present disclosure has been described in conjunction with specific embodiments of the present disclosure, many substitutions, modifications, and variations of the embodiments will be obvious to persons of ordinary skill in the art based on the foregoing descriptions. For example, other memory architectures (for example, dynamic RAM (DRAM)) may use the discussed embodiments.

The embodiments of the present disclosure are intended to cover all such substitutions, modifications and variations within the broad scope of the attached claims. Therefore, any omission, modification, equivalent replacement, improvement made within the spirit and principles of the embodiments of the present disclosure shall be included in the protection scope of the present disclosure.

The invention claimed is:

1. A stereoscopic display device, comprising a motor and a display panel, the display panel being driven by the motor to rotate to realize a stereoscopic display, and the stereoscopic display device further comprising: a memory and a processor, wherein the memory stores a computer program, and when executed by the processor, the memory implements a method comprising:

acquiring a control strategy of the motor and display parameters of the display panel matching the control strategy, wherein the control strategy indicates that each time the motor runs for a preset period of time, the motor is restarted;

controlling the motor to run according to the control strategy, to calibrate the motor by restarting; and driving the display panel to display according to the display parameters in the rotation process of the motor;

wherein the control strategy further indicates a change status of a rotational speed of the motor during the preset period of time; the change status is reflected by a rotational speed change curve showing a change of the rotational speed of the motor over time, and the rotational speed change curve comprises a plurality of deceleration zones; the motor runs at a uniform speed in each of the plurality of deceleration zones, and the motor decelerates between two adjacent deceleration zones among the plurality of deceleration zones; and, the display parameters comprise a display time of two-dimensional image slices in the display panel, and the two-dimensional image slices in a same deceleration zone have an equal display time, the two-dimensional image slices being obtained by a two-dimensional decomposition of a stereoscopic image to be displayed in the display panel.

2. The stereoscopic display device according to claim 1, wherein a two-dimensional image slice displayed between two adjacent deceleration zones has a display time longer than a display time of a two-dimensional image slice displayed in a preceding deceleration zone of the two adjacent deceleration zones, and shorter than a display time of a two-dimensional image slice displayed in a latter deceleration zone of the two adjacent deceleration zones.

3. The stereoscopic display device according to claim 1, wherein the rotational speed change curve further comprises a transition zone post the deceleration zone, and the motor is restarted in the transition zone.

4. The stereoscopic display device according to claim 1, wherein the rotational speed change curve further comprises an acceleration zone.

5. The stereoscopic display device according to claim 4, wherein the rotational speed change curve comprises a plurality of acceleration zones; the motor runs at a uniform speed in each of the plurality of acceleration zones, and the motor accelerates between two adjacent acceleration zones among the plurality of acceleration zones.

6. The stereoscopic display device according to claim 5, wherein the two-dimensional image slices in a same acceleration zone have an equal display time.

7. The stereoscopic display device according to claim 6, wherein a two-dimensional image slice displayed between two adjacent acceleration zones has a display time shorter than a display time of a two-dimensional image slice displayed in a preceding acceleration zone of the two adjacent acceleration zones, and longer than a display time of a two-dimensional image slice displayed in a latter acceleration zone of the two adjacent acceleration zones.

8. The stereoscopic display device according to claim 1, wherein driving the display panel to display according to the display parameters in the rotation process of the motor comprises:
sequentially driving the display panel to display each of the two-dimensional image slices to be displayed in the rotation process, based on the display time and display order of each of the two-dimensional image slices.

9. The stereoscopic display device according to claim 1, wherein the rotational speed change curve further comprises a uniform speed zone.

10. A non-transitory computer-readable storage medium on which one or more computer programs are stored, wherein when executed by a processor, the one or more computer programs perform a method of calibrating a stereoscopic display device comprising a motor and a display panel, the display panel being driven by the motor to rotate to realize a stereoscopic display, and the method comprising:
acquiring a control strategy of the motor and display parameters of the display panel matching the control strategy, wherein the control strategy indicates that each time the motor runs for a preset period of time, the motor is restarted;
controlling the motor to run according to the control strategy, to calibrate the motor by restarting; and
driving the display panel to display according to the display parameters in the rotation process of the motor;
wherein the control strategy further indicates a change status of a rotational speed of the motor during the preset period of time; the change status is reflected by a rotational speed change curve showing a change of the rotational speed of the motor over time, and the rotational speed change curve comprises a plurality of deceleration zones; the motor runs at a uniform speed in each of the plurality of deceleration zones, and the motor decelerates between two adjacent deceleration zones among the plurality of deceleration zones; and, the display parameters comprise a display time of two-dimensional image slices in the display panel, and the two-dimensional image slices in a same deceleration zone have an equal display time, the two-dimensional image slices being obtained by a two-dimensional decomposition of a stereoscopic image to be displayed in the display panel.

11. The storage medium according to claim 10, wherein a two-dimensional image slice displayed between two adjacent deceleration zones has a display time longer than a display time of a two-dimensional image slice displayed in a preceding deceleration zone of the two adjacent deceleration zones, and shorter than a display time of a two-dimensional image slice displayed in a latter deceleration zone of the two adjacent deceleration zones.

12. The storage medium according to claim 10, wherein the rotational speed change curve further comprises a transition zone post the deceleration zone, and the motor is restarted in the transition zone.

13. The storage medium according to claim 10, wherein the rotational speed change curve further comprises an acceleration zone.

14. The storage medium according to claim 13, wherein the rotational speed change curve comprises a plurality of acceleration zones; the motor runs at a uniform speed in each of the plurality of acceleration zones, and the motor accelerates between two adjacent acceleration zones among the plurality of acceleration zones.

15. The storage medium according to claim 14, wherein the two-dimensional image slices in a same acceleration zone have an equal display time.

16. The storage medium according to claim 15, wherein a two-dimensional image slice displayed between two adjacent acceleration zones has a display time shorter than a display time of a two-dimensional image slice displayed in a preceding acceleration zone of the two adjacent acceleration zones, and longer than a display time of a two-dimensional image slice displayed in a latter acceleration zone of the two adjacent acceleration zones.

17. The storage medium according to claim 10, wherein driving the display panel to display according to the display parameters in the rotation process of the motor comprises:
sequentially driving the display panel to display each of the two-dimensional image slices to be displayed in the rotation process, based on the display time and display order of each of the two-dimensional image slices.

18. The storage medium according to claim 10, wherein the rotational speed change curve further comprises a uniform speed zone.

19. A method of calibrating a stereoscopic display device comprising a motor and a display panel, the display panel being driven by the motor to rotate to realize a stereoscopic display, and the method comprising:
acquiring a control strategy of the motor and display parameters of the display panel matching the control strategy, wherein the control strategy indicates that each time the motor runs for a preset period of time, the motor is restarted;
controlling the motor to run according to the control strategy, to calibrate the motor by restarting; and
driving the display panel to display according to the display parameters in the rotation process of the motor;
wherein the control strategy further indicates a change status of a rotational speed of the motor during the preset period of time; the change status is reflected by a rotational speed change curve showing a change of the rotational speed of the motor over time, and the rotational speed change curve comprises a plurality of deceleration zones; the motor runs at a uniform speed in each of the plurality of deceleration zones, and the motor decelerates between two adjacent deceleration zones among the plurality of deceleration zones; and, the display parameters comprise a display time of two-dimensional image slices in the display panel, and the two-dimensional image slices in a same deceleration zone have an equal display time, the two-dimensional image slices being obtained by a two-dimensional decomposition of a stereoscopic image to be displayed in the display panel.

20. The method according to claim 19, wherein a two-dimensional image slice displayed between two adjacent deceleration zones has a display time longer than a display time of a two-dimensional image slice displayed in a preceding deceleration zone of the two adjacent deceleration zones, and shorter than a display time of a two-dimensional image slice displayed in a latter deceleration zone of the two adjacent deceleration zones.

* * * * *